(12) United States Patent
Laurent et al.

(10) Patent No.: US 8,391,402 B2
(45) Date of Patent: Mar. 5, 2013

(54) PROCESS AND DEVICE FOR ENCODING, AND ASSOCIATED ELECTRONIC SYSTEM AND STORAGE MEDIUM

(75) Inventors: Johann Laurent, Clohars Carnoët (FR); Antoine Courtay, Lorient (FR); Olivier Sentieys, Louannec (FR); Nathalie Julien, Lorient (FR)

(73) Assignees: Universite de Bretagne Sud, Lorient Cedex (FR); Universite de Rennes 1, Rennes Cedex (FR)

( * ) Notice: Subject to any disclaimer, the term of this patent is extended or adjusted under 35 U.S.C. 154(b) by 219 days.

(21) Appl. No.: 12/922,481

(22) PCT Filed: Feb. 11, 2009

(86) PCT No.: PCT/FR2009/050214
§ 371 (c)(1),
(2), (4) Date: Oct. 13, 2010

(87) PCT Pub. No.: WO2009/112729
PCT Pub. Date: Sep. 17, 2009

(65) Prior Publication Data
US 2011/0019766 A1    Jan. 27, 2011

(30) Foreign Application Priority Data
Mar. 14, 2008    (FR) ...................................... 08 51672

(51) Int. Cl.
*H03M 5/00* (2006.01)
(52) U.S. Cl. ............... 375/295; 341/55; 341/50; 341/58
(58) Field of Classification Search .................. 375/295, 375/267, 297, 347; 377/41; 710/30–35, 710/106, 110, 306
See application file for complete search history.

(56) References Cited

U.S. PATENT DOCUMENTS

| | | | |
|---|---|---|---|
| 4,667,337 A * | 5/1987 | Fletcher | 377/41 |
| 6,243,808 B1 | 6/2001 | Wang | |
| 6,933,863 B2 * | 8/2005 | Visalli et al. | 341/55 |
| 7,142,612 B2 * | 11/2006 | Horowitz et al. | 375/286 |

(Continued)

FOREIGN PATENT DOCUMENTS
EP    0 444 774    9/1991
EP    0444774 A2 *    9/1991

OTHER PUBLICATIONS

Timothy M. Hollis, Data Bus Inversion in High-Speed Memory Applications, Apr. 2009, IEEE, IEEE Transactions on Circuits and Systems-II: Express Briefs, vol. 56, No. 4, pp. 300-304.*

(Continued)

*Primary Examiner* — David C. Payne
*Assistant Examiner* — Michelle M Koeth
(74) *Attorney, Agent, or Firm* — Stephen J. Weyer, Esq.; Stites & Harbison, PLLC

(57) ABSTRACT

An encoder comprises a first and a second input, and a first and a second output, and the encoder comprises a selection block suitable for selecting a more significant bit and a less significant bit. The encoder comprises a switching block suitable for connecting the first input to the first output, and the second input to the second output, the switching block being suitable for being switched in order to connect the first input to the second output and the second input to the first output, when the selection block has selected a less significant bit and a more significant bit. A decoder, a storage medium and an electronic system is also disclosed.

15 Claims, 5 Drawing Sheets

U.S. PATENT DOCUMENTS

| | | | |
|---|---|---|---|
| 7,372,916 B2* | 5/2008 | Pappalardo et al. | 375/295 |
| 7,501,963 B1* | 3/2009 | Hollis | 341/55 |
| 2002/0019896 A1* | 2/2002 | Fornaciari et al. | 710/100 |
| 2007/0242508 A1* | 10/2007 | Bae | 365/184 |
| 2009/0179782 A1* | 7/2009 | Hollis | 341/55 |
| 2010/0026533 A1* | 2/2010 | Hollis | 341/58 |

OTHER PUBLICATIONS

Mircea R. Stan, Bus-Invert Coding for Low-Power I/O, Mar. 1995, IEEE, IEEE Transactions on Very Large Scale Integration (VLSI) Systems, vol. 3, No. 1, pp. 49-58.*

Youngsoo Shun et al., Partial Bus-Invert Coding for Power Optimization of System Level Bus, Aug. 1998, ACM, ISLPED 98, pp. 127-129.*

International Search Report for PCT/FR2009/050214.

* cited by examiner

| Cycle | Wire 12 | Wire 22 |
|---|---|---|
| t − p | 1 | 0 |
| t − p + 1 | 1 | 1 |
| ⋮ | ⋮ | ⋮ |
| t − 1 | 1 | 0 |
| t | 0 | 1 |
| ⋮ | ⋮ | ⋮ |
| t + p | 0 | 1 |
| t + p + 1 | 1 | 0 |
| ⋮ | ⋮ | ⋮ |

Number of electrical wires of the bus

PROCESS AND DEVICE FOR ENCODING, AND ASSOCIATED ELECTRONIC SYSTEM AND STORAGE MEDIUM

FIELD OF THE INVENTION

The present invention relates to a process and a device for encoding bits.

BACKGROUND OF THE INVENTION

The power consumption of electronic systems has increased considerably. This is the result, on the one hand, of the increase in the computing power necessary to perform complex tasks and, on the other hand, of the ever-growing volume of data to be processed. Indeed, when an electronic system processes a large volume of data, activity on the interconnections increases, and this has the effect of significantly increasing the power consumption of the electronic system. In this respect, studies show that, in current chip systems, the interconnections represent up to 60% of the total power consumption of the chip.

Numerous research works relate to the optimization of the power consumption of interconnections, especially by introducing encoders-decoders into electronic systems.

For example, the so-called "partial bus invert" technique, described in the document entitled Partial bus invert coding for power optimization of system level bus; Y. Shin, S. I K Chae and K. Choi; In processing of the 1998 international symposium on low power electronics and design (ISLPED); on pages 127-129 New York USA, 1998 ACM Press, consists in comparing the number of bits changing between a datum n−1 at clock cycle t−1 and a datum n at clock cycle t. If this difference, which is generally called the Hamming distance, is greater than half the width of the bus, then the datum sent at clock cycle t will be the complemented datum.

Nevertheless, the establishment of these techniques requires the addition of extra transistors, registers and electrical wires, which involves a new increase in the electrical energy consumed, so that the cost premium in terms of power consumption generated by these electronic components is sometimes equivalent to or even greater than the saving in power consumption obtained on the interconnection.

SUMMARY OF THE INVENTION

The invention relates to an encoder-decoder and to an alternative encoding-decoding process offering a saving in power consumption on the interconnection while at the same time introducing a minimum cost premium in terms of power consumption.

To this end, the invention relates to an encoder comprising a first and a second input which are to be connected to an electrical conductor of less significant bits and to an electrical conductor of more significant bits, respectively, and a first and a second output which are to be connected to an electrical conductor of less significant bits and to an electrical conductor of more significant bits, respectively, the encoder comprising a selection block suitable for selecting a more significant bit and a less significant bit, characterized in that the encoder comprises:

a switching block suitable for connecting, on the one hand, the first input to the first output, and, on the other hand, the second input to the second output, the switching block being suitable for being switched in order to connect the first input to the second output and the second input to the first output, when the selection block has selected a less significant bit and a more significant bit; and means for transmitting a warning signal of an inverted bit transmission.

According to particular embodiments, the encoder comprises one or more of the following features taken alone or in combination:

the selection block comprises:
  a first selection unit suitable for selecting at least one more significant bit at clock cycle t having a value different from the value of the bit at clock cycle t−1 transmitted by the first output;
  a second selection unit suitable for selecting at least one less significant bit at clock cycle t having a value different from the value of the bit at clock cycle t−1 transmitted after the second output; and
  a third selection unit suitable for selecting from the bits selected by the first and the second selection units, a more significant bit and a less significant bit, the more significant bit at clock cycle t having a value different from the value of the less significant bit at clock cycle t;

the first selection unit comprises a first logic gate connected to the first input of the encoder, and a first register connected to the first output of the encoder and to the first logic gate, the first register being suitable for storing the value of the bit at clock cycle t−1 transmitted by the first output, the first logic gate being suitable for comparing the value of the bit stored in the register with the more significant bit at clock cycle t received by the first input;

the second selection unit comprises a second logic gate connected to the second input of the encoder, and a second register connected to the second output of the encoder and to the second logic gate, the second register being suitable for storing the value of the bit at clock cycle t−1 transmitted by the second output, the second logic gate being suitable for comparing the value of the bit stored in the register with the value of the more significant bit at clock cycle t received by the second input;

the third selection unit comprises:
  a third logic gate connected to the first and to the second input of the encoder, the third logic gate being suitable for comparing the value of the less significant bit at clock cycle t with the value of the more significant bit at clock cycle t; and
  a fourth logic gate connected to the first, second and third selection units, the fourth logic gate being capable of generating a bit of predefined value when the first, second and third selection units have selected a more significant bit and a less significant bit at clock cycle t;

the selection block is suitable for generating a bit of predefined value when it selects a less significant bit and a more significant bit, the switching block comprising a first and a second connector, the switching of the connectors being controlled by the bit generated by the selection block; and the transmission means comprise a connection means which is to be connected to an additional electrical conductor, said connection means being connected to the output of the selection block, the warning signal being a bit of predefined value generated by the selection block.

The invention relates also to a decoder for decoding the bits encoded by the encoder of the above-mentioned type, the decoder comprising a first and a second input which are to be connected to an electrical conductor of less significant bits and to a conductor of more significant bits, respectively, and a first and a second output which are to be connected to an electrical conductor of less significant bits and to a conductor of more significant bits, respectively, characterized in that it comprises a switching block suitable for connecting, on the one hand, the first input to the first output, and, on the other hand, the second input to the second output, the switching block being suitable for being switched in order to connect the first input to the second output and the second input to the first output, when the switching block receives a warning signal of an inverted bit transmission from the encoder, the warning signal being transmitted by the encoder.

In a variant, the switching block comprises a first and a second connector each having a control electrode which is to be controlled by the warning signal transmitted by the encoder.

Furthermore, the invention relates also to an electronic system comprising at least one encoder and a decoder of the above-mentioned type, and a data bus comprising at least 2n electrical conductors, n being a natural integer, at least two electrical conductors of least significant bits of the data bus being connected to one or each encoder and to the decoder.

The invention relates also to a process for encoding bits transmitted by at least a first and a second electrical conductor which are suitable for transmitting more significant bits and less significant bits, respectively, the process comprising a step of selecting at clock cycle t a less significant bit and a more significant bit, characterized in that it also comprises the following steps:

transmitting the selected more significant bit and the selected less significant bit on the second and the first electrical conductor, respectively; and transmitting a warning signal of an inverted bit transmission.

In a variant, the selection step comprises the following steps:

a) selecting at least one less significant bit at clock cycle t having a value different from the value of a less significant bit at clock cycle t−1;

b) selecting at least one more significant bit at clock cycle t having a value different from the value of a more significant bit at clock cycle t−1;

c) from the bits selected in steps a) and b), selecting a less significant bit and a more significant bit, the more significant bit at clock cycle t having a value different from that of the less significant bit at clock cycle t.

In addition, the invention relates also to a process for decoding bits encoded according to the encoding process of the above-mentioned type, wherein more significant bits and less significant bits are to be transmitted by at least a first and a second electrical conductor, respectively, characterized in that the process comprises, on receiving a warning signal of an inverted bit transmission, a step of transmitting the less significant bit on the second electrical conductor and the more significant bit on the first electrical conductor.

Finally, the invention relates to a data storage medium, characterized in that it comprises instructions for executing an encoding process of the above-mentioned type, when these instructions are executed by a computer.

According to particular embodiments, the data storage medium comprises instructions for executing a decoding process of the above-mentioned type, when these instructions are executed by a computer.

BRIEF DESCRIPTION OF THE DRAWINGS

The invention will be better understood on reading the following description which is given purely by way of example and with reference to the appended drawings, in which.

DETAILED DESCRIPTION

Figure 1:
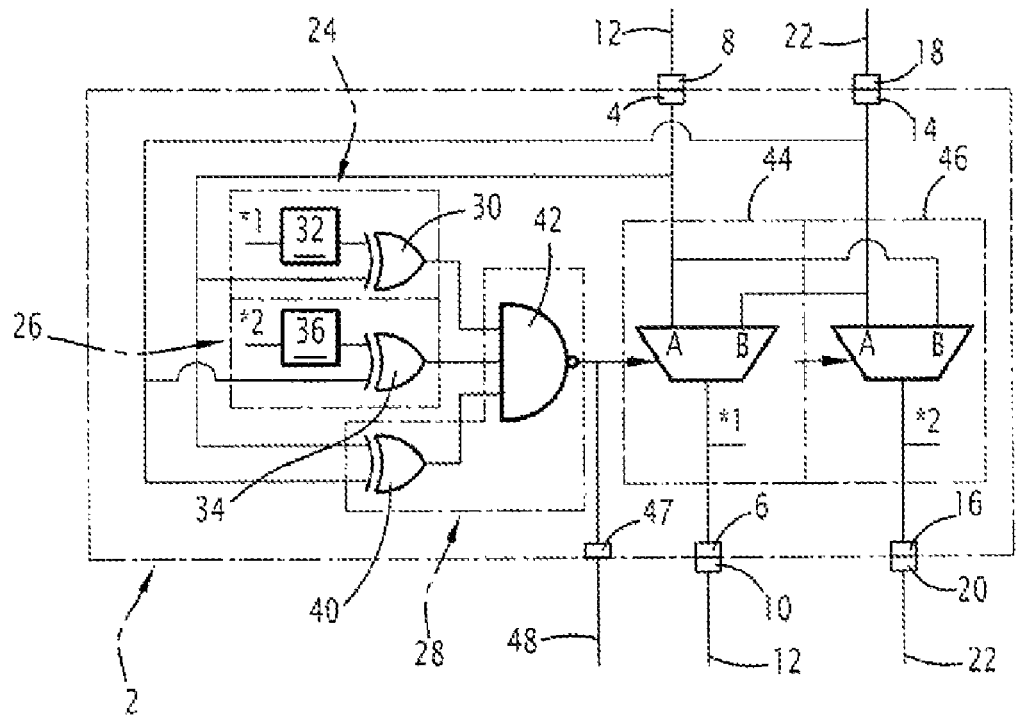
FIG. 1 is a diagram showing the architecture of an encoder according to the invention.

Referring to FIG. 1, the encoder 2 according to the invention comprises a first input connector 4 and a first output connector 6 which are to be connected to a first electrical conductor 12 via a complementary connector 8, 10.

The encoder 2 also comprises a second input connector 14 and a second output connector 16 which are to be connected to a second conductor wire 22 via a complementary connector 18, 20.

The first 4 and the second 14 input connectors are referred to hereinafter as the first and second inputs. Likewise, the first 6 and the second 16 output connectors are referred to hereinafter as the first and second outputs.

The first 12 and second 22 electrical conductors are two mutually adjacent electrical wires, for example, of a set of parallel electrical wires called parallel buses.

The first electrical wire 12 is capable of transmitting the most significant bits from among the two electrical wires of the bus which are shown in FIG. 1.

The encoder 2 comprises a first 24, a second 26 and a third 28 selection unit which are capable of selecting two spatially inverted bit transitions on two adjacent wires 12, 22, that is to say, a passage from a bit value of 0 to 1 on one wire and a passage from a bit value of 1 to 0 on the other wire at the same clock cycle t.

The first selection unit 24 is formed by a first XOR logic gate 30, connected at the input to the first input 4, and by a register 32 connected at the input to the first output 6 and at the output to the first logic gate 30. The first logic gate is an XOR gate, that is to say, an "exclusive or" gate.

The second selection unit 26 is similar to the first selection unit 24. It comprises a second logic gate 34 of the XOR type connected at the input to the second input 14, and a register 36 connected at the input to the second output 16 and at the output to the second XOR gate 34.

The first 24, the second 26 and the third 28 selection units form a selection block.

The third selection unit 28 comprises a third logic gate 40 of the XOR type, one input of which is connected to the first input 4 and the other input of which is connected to the second input 14, and a fourth logic gate 42 connected at the input to the outputs of the first 30, second 34 and third 40 XOR gates.

The fourth logic gate 42 is a NAND gate, that is to say, a "not-and" gate.

The encoder 2 also comprises a first 44 and a second 46 switchable connector suitable for transmitting specific less significant bits selected by the selection units, on the electrical wire for transmitting the more significant bit 12, and specific more significant bits selected by the selection units, on the electrical wire for transmitting the less significant bit 22, as explained hereinafter.

The first connector 44 is formed by a multiplexer 44, the channels A and B of which are connected to the first input 4 and to the second input 14, respectively. The output of the multiplexer 44 is connected to the first output 6.

The second connector 46 is formed by a multiplexer 46, the channels A and B of which are connected to the second input 14 and to the first input 4, respectively. The output of the multiplexer 46 is connected to the second output 16.

The control electrodes of the multiplexers 44 and 46 are connected to the output of the NAND gate 42.

Finally, the encoder 2 also comprises a connection means 47 connected to the output of the NAND gate 42. The connection means 47 is to be connected to a third electrical wire 48 which transmits bits having a value equal to 0, which are generated by that NAND gate 42, to the decoder 60 according to the invention.

Figure 2:
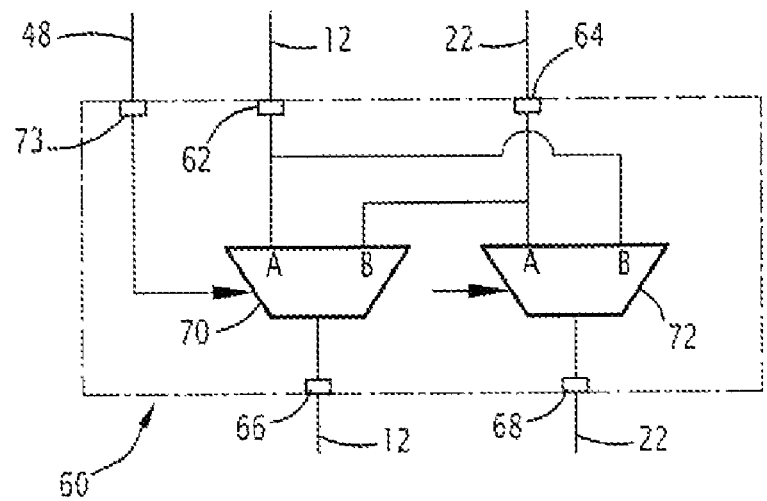
FIG. 2 is a diagram showing a decoder according to the invention.

Referring to FIG. 2, the decoder 60 according to the invention comprises a first 62 and a second 64 input connector, which are referred to hereinafter as the first and second inputs; and a first 66 and a second 68 output connector which are referred to hereinafter as the first and second outputs.

The first input 62 and the first output 66 are suitable for being connected to the first electrical wire 12 for transmitting more significant bits. The second input 64 and the second output 68 are suitable for being connected to the second electrical wire 22 for transmitting less significant bits.

The decoder 60 comprises a first 70 and a second 72 switchable connector forming a switching block. The connectors 70, 72 are suitable for addressing to the electrical wire 22 the less significant bits transmitted by the electrical wire 12, and for addressing to the electrical wire 12 the more significant bits transmitted by the electrical wire 22.

The first switchable connector 70 is constituted by a multiplexer 70, the channels A and B of which are connected to the first 62 and the second 64 input, respectively. The output of the multiplexer 70 is connected to the first output 66.

Similarly, the second switchable connector 72 is constituted by a multiplexer 72, the channels A and B of which are connected to the second 64 and the first 62 input, respectively. The output of the multiplexer 72 is connected to the second output 68.

The control electrodes of the multiplexers 70 and 72 are each connected to a connection means 73 which is to be connected to the third electrical wire 48 connected to the encoder 2.

Figure 3:
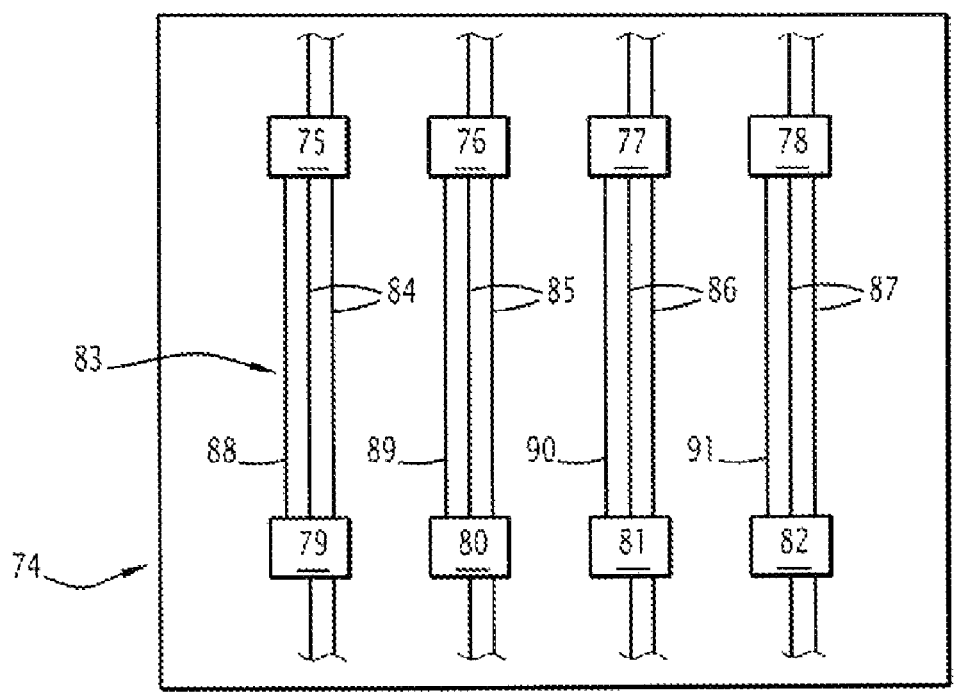
FIG. 3 is a schematic diagram of an electronic system comprising an encoder and a decoder according to the invention.

Referring to FIG. 3, the invention relates also to an electronic system 74, shown diagrammatically, comprising a parallel data bus 83 provided with eight electrical wires, as well as four encoders 75, 76, 77, 78 and four decoders 79, 80, 81, 82, such as described above. The encoders 75, 76, 77, 78 are each connected to one of the decoders 79, 80, 81, 82 by a pair of electrical wires 84, 85, 86, 87. An additional electrical wire 88, 89, 90, 91 for transmitting the warning signal is connected to each encoder and to the decoder to which the encoder is connected.

Each encoder and each decoder is suitable for encoding and decoding the bits travelling along the electrical wires to which they are connected, so that all of the bits travelling on the parallel bus 83 are encoded and decoded.

Such an electronic system 74 is any system comprising a data bus or even simply two electrical wires. Such a system is, for example, a computer, a mobile telephone, a washing machine, a television receiver, a train or a motor vehicle.

In a variant, the electronic system comprises 2n electrical wires, n encoders and n decoders, n being a natural integer.

Figure 4:
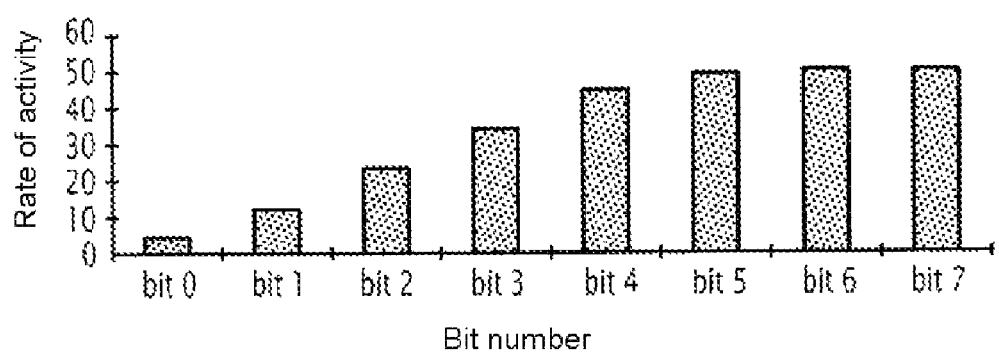
FIG. 4 is a diagram showing the rate of activity of the bits on a bus.

In a variant, only the two or the four electrical wires of least significant bits from among the electrical wires of bits of the bus 83 are connected to an encoder and to a decoder. Indeed, as shown in FIG. 4, the rate of activity of the less significant bits is greater than the rate of activity of the more significant bits. Consequently, the power consumption of the n/2+1 less significant bits of the bus (called bits 7 to 3) represents more than 80% of the overall power consumption of the bus.

In a variant, the NAND gate 42 is replaced by an AND gate.

When only the two 87 (or the four) electrical wires of least significant bits from among the electrical wires 84, 85, 86, 87 of bits of the data bus are connected to an encoder 78 and to a decoder 82, the electrical wire of most significant bits from among the two (or four) electrical wires connected is regarded as being the electrical conductor of more significant bits.

Figure 5:
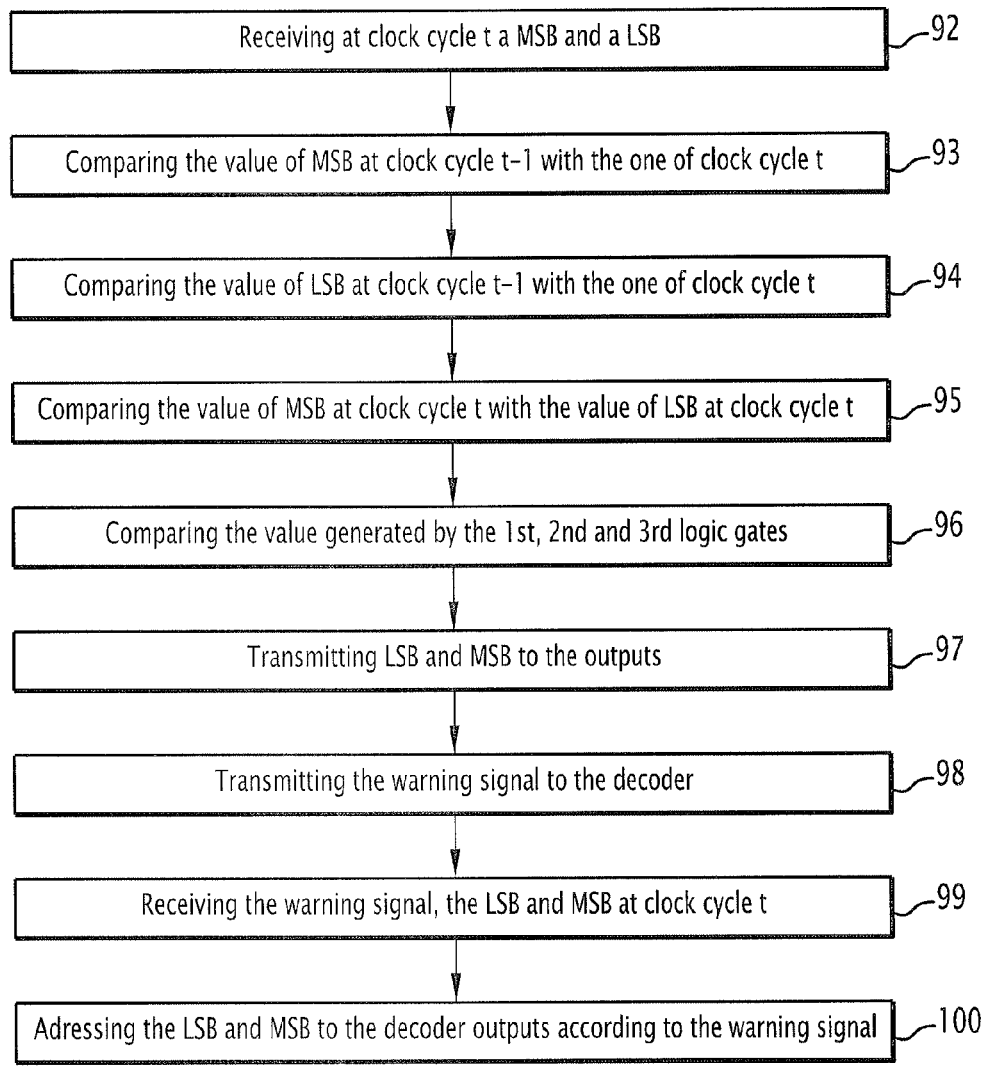
FIG. 5 is a chart of the steps of the encoding and decoding process according to the invention.
Figures 6, 7:
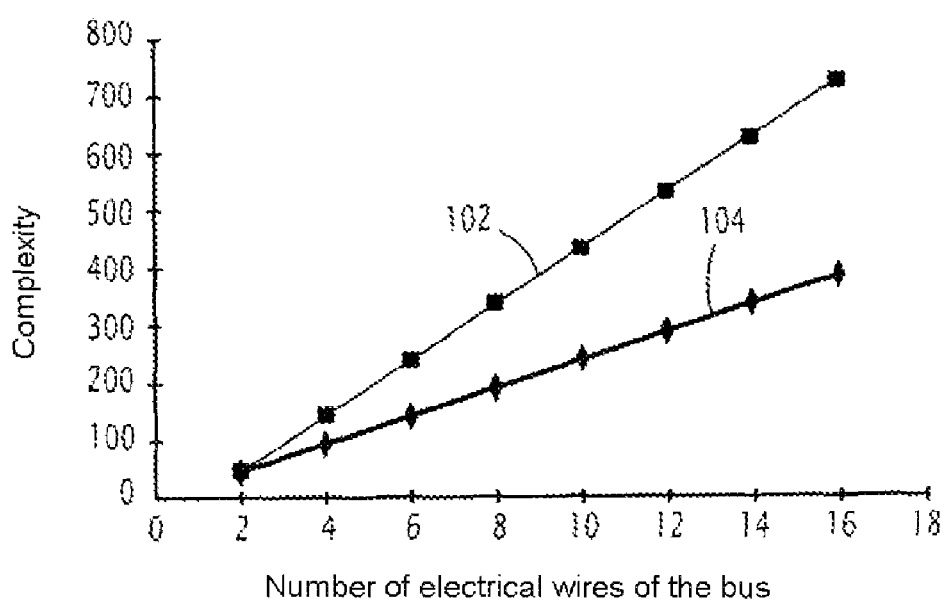
FIG. 6 is a table showing examples of bit transitions on two adjacent electrical wires.
FIG. 7 is a graph showing the development of the number of transistors as a function of the number of bits to be processed for an encoder according to the invention and an existing encoder.

With reference to FIGS. 5 and 6, the process for encoding bits starts with a step 92 for receiving at clock cycle t a more significant bit having a value equal to 0 at the first input 4, and a less significant bit having a value equal to 1 at the second input 14.

In the course of a step 93, the first selection unit 24 compares the value of the more significant bit at clock cycle t−1 with the value of the more significant bit at clock cycle t. As shown in FIG. 6, the more significant bit at clock cycle t−1 has a value equal to 1 and the more significant bit at clock cycle t has a value equal to 0. These two bits have different values. Consequently, the first XOR gate 30 generates a bit having a value equal to 1 at its output.

In the course of a step 94, the second selection unit 26 compares the value of the less significant bit at clock cycle t−1 with the value of the less significant bit at clock cycle t. As shown in FIG. 6, these two bits have different values and therefore the second XOR gate 34 generates a bit having a value equal to 1 at its output.

In the course of a step 95, the third selection unit 28 compares the value of the more significant bit at clock cycle t with the value of the less significant bit at clock cycle t. These two bits have different values and therefore the third XOR gate 40 generates a bit having a value equal to 1 at its output.

In the course of a step 96, the fourth NAND gate 42 compares the values of the bits generated by the first 30, second 34 and third 40 XOR gates. The fourth NAND gate 42 generates a bit having a value equal to 0 because, in this case, all of these values are equal to 1. This bit is transmitted to the control electrodes of the multiplexers 44 and 46.

On receiving this bit having a value equal to 0, the multiplexer 44 transmits the less significant bit coming from the second input 14 to the first output 6, in the course of a step 97.

On receiving this bit having a value equal to 0, the multiplexer 46 transmits the more significant bit coming from the first input 4 to the second output 16, in the course of step 97.

In the course of a step 98, the third electrical wire 48 transmits the bit having a value equal to 0 at clock cycle t coming from the NAND gate 42 to the decoder 60. This bit constitutes a warning signal of a spatially inverted bit transmission.

The behaviour of the encoder 2 is represented by the following equation:

$$(12(t-1) XOR 12(t))$$

and $$(12(t) XOR 22(t))$$

and $$(22(t-1)) XOR 22(t)) = 1$$

In the course of a step 99, the decoder 60 receives the warning signal, as well as the more significant bit at clock cycle t on the electrical wire for transmitting less significant bits, and the less significant bit at clock cycle t on the electrical wire for transmitting more significant bits.

In the course of a step 100, the multiplexer 70 controlled by the warning signal addresses the more significant bit coming from the second input 64 to the first output 66. At the same time, the multiplexer 72 controlled by the warning signal addresses the less significant bit coming from the first input 62 to the second output 68.

In other words, the multiplexer 44 transmits the more significant bit transmitted by the first wire 12, that is to say, the wire for transmitting more significant bits, on the second wire 22. Likewise, the multiplexer 46 transmits the less significant bit transmitted by the second wire 22, that is to say, the wire for transmitting less significant bits, on the first wire 12.

Thus, the encoding process addresses a less significant bit on the electrical wire for transmitting more significant bits, and a more significant bit on the electrical wire for transmitting less significant bits when two adjacent wires comprise spatially inverted bit transitions.

Another inverted transition is illustrated in FIG. 6, at clock cycles t+p and t+p+1. The decoding process effects an inverted transmission in order to re-establish the correct bit order.

When the encoding process is not applied to two spatially inverted bit transitions on two adjacent wires, such as, for example, at clock cycle t−p+1, the first selection unit 24 compares the value of the more significant bit at clock cycle t−p+1 with the value of the more significant bit at clock cycle t−p. As shown in FIG. 6, these two bits have the same value and therefore the first XOR gate 30 generates a bit having a value equal to 0 at its output.

The second selection unit 26 then compares the value of the less significant bit at clock cycle t−p+1 with the value of the less significant bit at clock cycle t−p. As shown in FIG. 6, these two bits have different values and therefore the second XOR gate 34 generates a bit having a value equal to 1 at its output.

The third XOR gate 40 compares the value of the more significant bit at clock cycle t−p+1 with the value of the less significant bit at clock cycle t−p+1. Since these values are identical, the selection unit 28 generates a bit having a value equal to 0 at its output.

Since the NAND gate 42 receives at its input two bits having the value 0 and one bit having the value 1, it generates at its output a bit having the value 1.

The multiplexer 44 transmits the more significant bit transmitted by the wire 12, that is to say, the wire for transmitting more significant bits, on this same wire 12. In other words, the multiplexer 44 connects the first input 4 to the first output 6.

Likewise, the multiplexer 46 transmits the less significant bit transmitted by the wire 22, that is to say, the wire for transmitting less significant bits, on this same wire 22. In other words, the multiplexer 46 connects the second input 14 to the second output 16.

The decoder 60 does not receive a warning signal, with the result that the multiplexer 70 connects the first input 62 to the first output 66 and the second multiplexer 72 connects the second input 64 to the first output 68.

FIG. 7 shows a graph illustrating the complexity of an encoder-decoder as a function of the number of electrical wires of the bus. The complexity of an encoder-decoder represents the number of transistors added to the electronic system by the addition of the encoder and the decoder.

In FIG. 7, the line 104 represents the complexity for an encoder-decoder according to the invention and the line 102 represents the complexity for an encoder-decoder of the bus invert type.

As shown on this graph, the greater the number of electrical wires of the bus, the greater the number of transistors required by the encoder-decoder of the bus invert type. These transistors too consume electrical energy. This reduces the saving in overall power consumption of this encoder-decoder.

Figure 8:
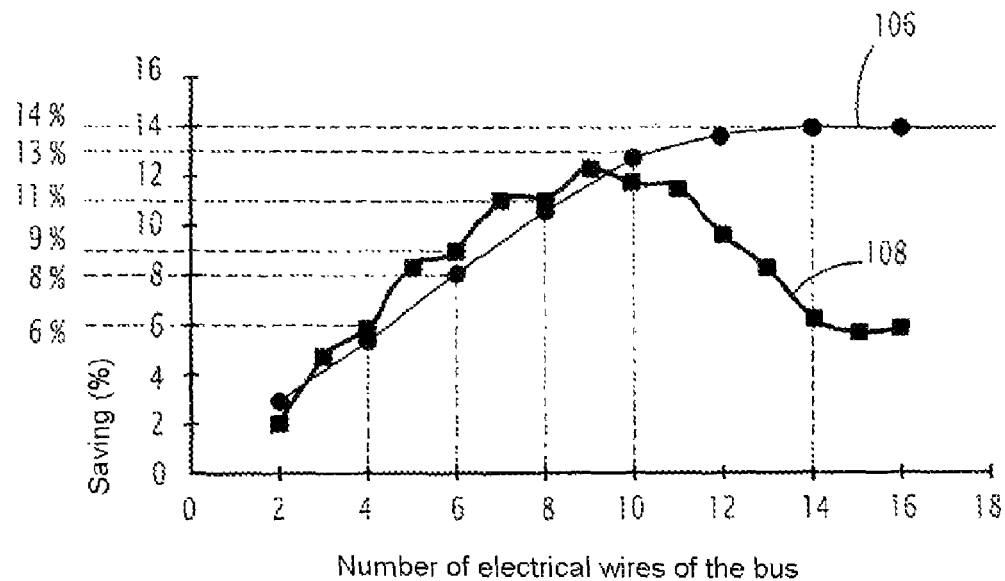
FIG. 8 is a graph showing the saving in power consumption as a function of the number of electrical wires of a bus for speech-type data.
Figure 9:
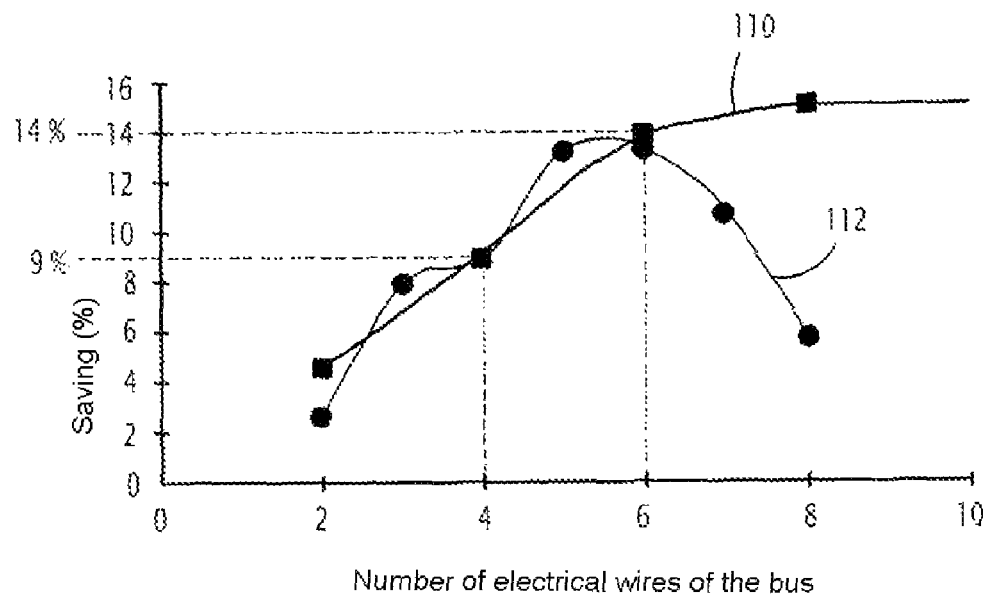
FIG. 9 is a graph identical to the graph of FIG. 8 for image-type data.

FIGS. 8 and 9 show savings in power consumption on the bus as a function of the number of electrical wires connected to an encoder-decoder according to the invention and to an encoder-decoder of the bus invert type.

In particular, FIG. 8 shows the saving for speech-type data, while FIG. 9 shows the saving for image-type data.

In FIG. 8, the saving in power consumption on the bus provided with the encoders-decoders according to the invention, illustrated by the curve 106, is greater than the saving in power consumption on the bus provided with the encoders-decoders of the bus invert type illustrated by the curve 108, when the number of electrical wires per bus is greater than ten electrical wires.

These curves 106, 108 do not take into account the power consumption of the electronic components of the encoders-decoders. When this consumption is taken into account, the saving in power consumption on the bus provided with the encoders-decoders according to the invention is greater than the saving on the bus provided with the encoders-decoders of the bus invert type for a number of wires lower than ten wires because the complexity of the encoders-decoders according to the invention is less than that of the encoders-decoders of the bus invert type.

Unlike the saving in power consumption of a bus provided with encoders-decoders of the bus invert type, the saving in power consumption of a bus provided with encoders-decoders according to the invention reaches and remains at a maximum value when fourteen or more than fourteen electrical wires of the bus are connected to encoders-decoders according to the invention.

In FIG. 9, the saving in power consumption on the bus provided with the encoders-decoders according to the invention, illustrated by the curve 110, is greater than the saving in power consumption on the bus provided with the encoders-decoders of the bus invert type illustrated by the curve 112, when the number of electrical wires per bus is greater than six electrical wires.

The curves 110 and 112 do not take into account the power consumption of the components of the encoders-decoders. Likewise, unlike the saving in power consumption of a bus provided with encoders-decoders of the bus invert type, the saving in power consumption of a bus provided with encoders-decoders according to the invention reaches and remains at a maximum value when six or more than six electrical wires of the bus are connected to encoders-decoders according to the invention.

Advantageously, the encoder and the decoder according to the invention enable the saving in power consumption of electronic systems, and in particular of systems comprising buses having a large number of electrical wires, to be increased.

In a variant, the encoder and/or the decoder is (are) produced from a micro-controller comprising a memory in which software is recorded, the software comprising a portion or block of selection software and a portion or block of switching software.

This embodiment is advantageous from the point of view of electricity consumption only when this micro-controller is shared, that is to say, when it also performs other functions within the electronic system.

The invention therefore relates also to a data storage medium which comprises instructions for executing the encoding process and/or the decoding process when these instructions are executed by a micro-controller.

The invention claimed is:

1. An encoder comprising a first and a second input which are to be connected to an electrical conductor of a less significant bit and to an electrical conductor of a more significant bit, respectively;
    a first and a second output which are to be connected to an electrical conductor of a less significant bit and to an electrical conductor of a more significant bit, respectively;
    a selection block suitable for selecting a transition of the more significant bit and a transition of the less significant bit, each between a clock cycle t−1 and a clock cycle t, the two transitions being spatially inverted on the electrical conductors of the less significant bit and of the more significant bit, said transitions comprising a passage between clock cycle t−1 and clock cycle t from a bit value of 0 to 1 on one electrical conductor among said electrical conductors of the less significant bit and of the more significant bit and a passage between said clock cycle t−1 and clock cycle t from a bit value of 1 to 0 on the other electrical conductor among said electrical conductors;
    a switching block suitable for connecting the first input to the first output, and the second input to the second output, and for being switched in order to connect the first input to the second output and the second input to the first output when the selection block has selected the two transitions being spatially inverted; and
    means for transmitting a warning signal of an inverted bit transmission.

2. An encoder according to claim 1, wherein the selection block comprises:
    a first selection unit suitable for selecting at least one more significant bit at clock cycle t having a value different from the value of the bit at clock cycle t−1 transmitted by the first output;
    a second selection unit suitable for selecting at least one less significant bit at clock cycle t having a value different from the value of the bit at clock cycle t−1 transmitted after the second output; and
    a third selection unit suitable for selecting from the bits selected by the first and the second selection units, a more significant bit and a less significant bit, the more significant bit at clock cycle t having a value different from the value of the less significant bit at clock cycle t.

3. An encoder according to claim 2, wherein the first selection unit comprises a first logic gate connected to the first input of the encoder, and a first register connected to the first output of the encoder and to the first logic gate, the first register being suitable for storing the value of the bit at clock cycle t−1 transmitted by the first output, the first logic gate being suitable for comparing the value of the bit stored in the register with the more significant bit at clock cycle t received by the first input.

4. An encoder according to claim 2, wherein the second selection unit comprises a second logic gate connected to the second input of the encoder, and a second register connected to the second output of the encoder and to the second logic gate, the second register being suitable for storing the value of the bit at clock cycle t−1 transmitted by the second output, the second logic gate being suitable for comparing the value of the bit stored in the register with the value of the more significant bit at clock cycle t received by the second input.

5. An encoder according to claim 2, wherein the third selection unit comprises:
    a third logic gate connected to the first and to the second input of the encoder, the third logic gate being suitable for comparing the value of the less significant bit at clock cycle t with the value of the more significant bit at clock cycle t; and
    a fourth logic gate connected to the first and second selection units and to the third logic gate, the fourth logic gate being capable of generating a bit of predefined value when the first and second selection units and the third logic gate have selected a more significant bit and a less significant bit at clock cycle t.

6. An encoder according to claim 1, wherein the selection block is suitable for generating a bit of predefined value when it selects a less significant bit and a more significant bit, the switching block comprising a first and a second connector, the switching of the connectors being controlled by the bit generated by the selection block.

7. An encoder according to claim 1, wherein the transmission means comprise a connection means which is to be connected to an additional electrical conductor, the connection means being connected to the output of the selection block, the warning signal being a bit of predefined value generated by the selection block.

8. A decoder for decoding the bits encoded by the encoder according to claim 1, the decoder comprising a first and a second input which are to be connected to an electrical conductor of a less significant bit and to a conductor of a more significant bit, respectively, and a first and a second output which are to be connected to an electrical conductor of a less significant bit and to a conductor of a more significant bit, respectively; and
    a switching block suitable for connecting the first input to the first output, and the second input to the second output, the switching block being suitable for being switched in order to connect the first input to the second output and the second input to the first output, when the switching block receives a warning signal of an inverted bit transmission from the encoder, the warning signal being transmitted by the encoder.

9. A decoder according to claim 8, wherein the switching block comprises a first and a second connector each having a control electrode which is to be controlled by the warning signal transmitted by the encoder.

10. An electronic system, said electronic system comprising:
    at least one encoder, said encoder comprising:

a first and a second input which are to be connected to an electrical conductor of a less significant bit and to an electrical conductor of a more significant bit, respectively, and a first and a second output which are to be connected to an electrical conductor of a less significant bit and to an electrical conductor of a more significant bit, respectively;

a selection block suitable for selecting a transition of the more significant bit and a transition of the less significant bit, each between a clock cycle t−1 and a clock cycle t, the two transitions being spatially inverted on the electrical conductors of the less significant bit and of the more significant bit, said transitions comprising a passage between clock cycle t−1 and clock cycle t from a bit value of 0 to 1 on one electrical conductor among said electrical conductors of the less significant bit and of the more significant bit and a passage between said clock cycle t−1 and clock cycle t from a bit value of 1 to 0 on the other electrical conductor among said electrical conductors;

a switching block suitable for connecting the first input to the first output, and the second input to the second output and suitable for being switched in order to connect the first input to the second output and the second input to the first output, when the selection block has selected the two transitions being spatially inverted; and means for transmitting a warning signal of an inverted bit transmission; a decoder; and a data bus comprising at least 2n electrical conductors, n being a natural integer, at least two electrical conductors of least significant bits of the data bus being connected to one or each encoder and to the decoder.

11. A process for encoding bits transmitted by at least a first and a second electrical conductor which are suitable for transmitting a more significant bit and a less significant bit, respectively, the process comprising:

selecting at clock cycle t a less significant bit and a more significant bit, characterized in that the selection step selects a transition of the more significant bit and a transition of the less significant bit, each between a clock cycle t−1 and a clock cycle t, the two transitions being spatially inverted on the first and second electrical conductors, said transitions comprising a passage between clock cycle t−1 and clock cycle t from a bit value of 0 to 1 on one electrical conductor among said electrical conductors of less significant bit and of more significant bit and a passage between said clock cycle t−1 and clock cycle t from a bit value of 1 to 0 on the other electrical conductor among said electrical conductors;

transmitting the selected more significant bit and the selected less significant bit on the second and the first electrical conductor, respectively; and transmitting a warning signal of an inverted bit transmission.

12. A process for encoding bits according to claim 11, wherein the selection step comprises the following steps:

a) selecting at least one less significant bit at clock cycle t having a value different from the value of a less significant bit at clock cycle t−1;

b) selecting at least one more significant bit at clock cycle t having a value different from the value of a more significant bit at clock cycle t−1;

c) from the bits selected in steps a) and b), selecting a less significant bit and a more significant bit, the more significant bit at clock cycle t having a value different from that of the less significant bit at clock cycle t.

13. A process for decoding bits encoded according to the encoding process of claim 11, wherein a more significant bit and a less significant bit are to be transmitted by at least a first and a second electrical conductor, respectively, characterized in that the process comprises, on receiving a warning signal of an inverted bit transmission, a step of transmitting the less significant bit on the second electrical conductor and the more significant bit on the first electrical conductor.

14. A data storage medium, characterized in that it comprises instructions for executing an encoding process according to claim 11, when these instructions are executed by an electronic calculator.

15. A data storage medium, characterized in that it comprises instructions for executing a decoding process according to claim 13, when these instructions are executed by an electronic calculator.

\* \* \* \* \*